United States Patent
McDorman

(12) 
(10) Patent No.: US 9,174,771 B2
(45) Date of Patent: Nov. 3, 2015

(54) PACKAGING SYSTEM FOR PRESERVING A NONOXYGENATED HEMOGLOBIN BASED OXYGEN THERAPEUTIC PRODUCT

(71) Applicant: Sangart, Inc., San Diego, CA (US)

(72) Inventor: Minda McDorman, San Diego, CA (US)

( * ) Notice: Subject to any disclaimer, the term of this patent is extended or adjusted under 35 U.S.C. 154(b) by 74 days.

(21) Appl. No.: 13/895,751

(22) Filed: Aug. 20, 2013

(65) Prior Publication Data
US 2013/0327677 A1  Dec. 12, 2013

Related U.S. Application Data

(60) Provisional application No. 61/787,541, filed on Mar. 15, 2013.

(51) Int. Cl.
| | |
|---|---|
| *A61J 1/05* | (2006.01) |
| *B65D 25/00* | (2006.01) |
| *A61J 1/10* | (2006.01) |
| *B32B 15/00* | (2006.01) |
| *B65D 77/04* | (2006.01) |
| *B65D 81/20* | (2006.01) |
| *B65D 81/26* | (2006.01) |
| *A61J 1/16* | (2006.01) |

(52) U.S. Cl.
CPC . *B65D 25/00* (2013.01); *A61J 1/10* (2013.01); *A61J 1/16* (2013.01); *B32B 15/00* (2013.01); *B65D 77/04* (2013.01); *B65D 81/2084* (2013.01); *B65D 81/268* (2013.01)

(58) Field of Classification Search
CPC ........... B65D 25/00; B65D 77/04; A61J 1/10; B32B 15/00
USPC ............ 206/524.1, 524.2, 524.6, 484, 484.2, 206/438, 828; 383/109, 113; 428/36.6, 220; 526/348.5, 352.2; 530/385; 604/403, 604/408, 410
See application file for complete search history.

(56) References Cited

U.S. PATENT DOCUMENTS

| | | | | |
|---|---|---|---|---|
| 6,007,529 | A * | 12/1999 | Gustafsson et al. | 604/410 |
| 6,039,718 | A * | 3/2000 | Niedospial, Jr. | 604/408 |
| 6,186,997 | B1 * | 2/2001 | Gabbard et al. | 604/408 |
| 7,041,800 | B1 | 5/2006 | Gawryl et al. | |
| 2003/0065149 | A1 * | 4/2003 | McGinnis et al. | 530/385 |
| 2010/0249699 | A1 * | 9/2010 | Roy et al. | 604/416 |
| 2010/0249728 | A1 * | 9/2010 | Kobashi et al. | 604/408 |
| 2010/0256590 | A1 * | 10/2010 | Babrowicz et al. | 604/408 |
| 2013/0266786 | A1 * | 10/2013 | Malakoff et al. | 428/220 |
| 2014/0276527 | A1 * | 9/2014 | Sandford et al. | 604/408 |

OTHER PUBLICATIONS

Rollprint Packaging Products, Inc., "ClearFoil(R), Transparent Ultra-High Barrier," 2012, 1 page.
Rollprint Packaging Products, Inc., "Film Preserves Blood Substitute, Transparent Laminate Prevents Oxygen and Moisture Loss," Reprinted from Pharmaceutical & Medical Packaging News, 2004, 1 page.

\* cited by examiner

*Primary Examiner* — Luan K Bui
(74) *Attorney, Agent, or Firm* — Senniger Powers LLP

(57) ABSTRACT

The present invention relates generally to a packaging system for preserving a nonoxygenated hemoglobin based oxygen therapeutic agent. More specifically, the present invention relates to a transparent overwrap packaging system comprising a primary product contacting package, a secondary package comprising a multilayer high barrier oxygen overwrap.

1 Claim, 1 Drawing Sheet

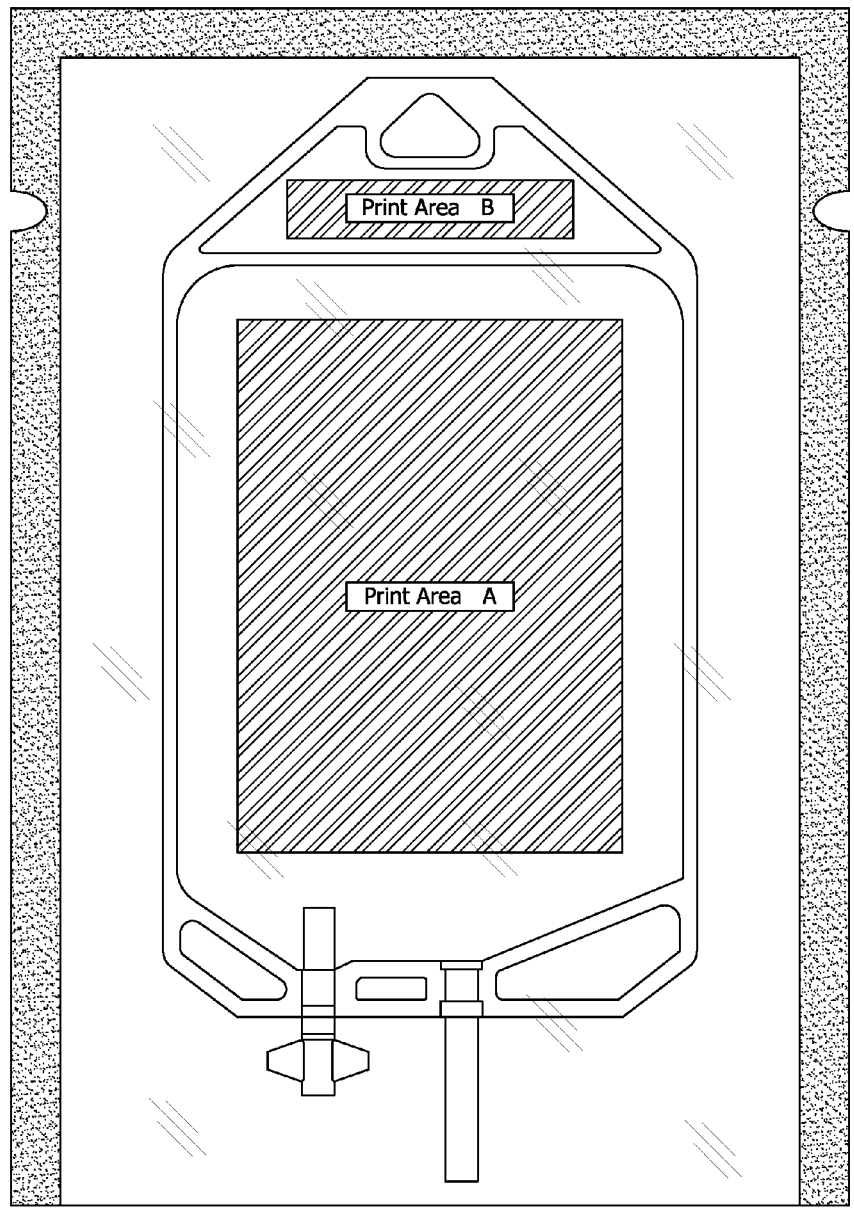

PACKAGING SYSTEM FOR PRESERVING A NONOXYGENATED HEMOGLOBIN BASED OXYGEN THERAPEUTIC PRODUCT

CROSS-REFERENCE TO RELATED APPLICATION

This application claims the benefit of U.S. Provisional Application Ser. No. 61/787,541 which was filed on Mar. 15, 2013. The entire content of the provisional application is incorporated herein by reference.

FIELD OF THE INVENTION

The present invention relates generally to a packaging system for preserving a nonoxygenated hemoglobin based oxygen therapeutic agent. More specifically, the present invention relates to a transparent overwrap packaging system comprising a primary product contacting package, a secondary package comprising a multilayer high barrier oxygen overwrap.

BACKGROUND OF THE INVENTION

There is an ever increasing number of therapeutic intravenous (IV) fluids being developed for delivery that are susceptible to gases such as oxygen and carbon dioxide, and thus need to be packaged properly to avoid degradation. These therapeutic fluids must be preserved and protected from contact by such gases to maintain the efficacy of the therapeutic fluid.

For example, hemoglobin solutions are known to lose their ability to function as oxygen therapeutic agents during storage. A hemoglobin solution loses its ability to function as a oxygen therapeutic agent because of spontaneous transformation of oxyhemoglobin in the solution to methemoglobin, a physiologically inactive form of hemoglobin that does not function as a oxygen therapeutic agent by releasing oxygen into a patient's bloodstream. To improve shelf life, oxygen therapeutic agents can be refrigerated, frozen or deoxygenated in efforts to control the oxygenation state of the hemoglobin within the solution.

A common storage container for a hemoglobin solution is a flexible container made of plastic polymer film, most notably an intravenous (IV) bag. Further, the container for a hemoglobin solution should be made from a material that complies with U.S. Pharmacopeia (USP) Class VI classification (physical, chemical and biocompatibility) and that is non-pyrogenic. Unlike IV bags for many other solutions, IV bags used specifically for hemoglobin solutions stored in a deoxygenated state must also provide a sufficient barrier to the passage of moisture vapor and other gases to preserve the deoxygenated state of the hemoglobin solution contained therein. Specifically, it is typically desirable for such containers to possess high oxygen barrier properties to enable deoxygenated hemoglobin solutions to be stored for weeks or months at room temperature. For example, ethylene vinyl alcohol (EVOH) is known to provide a high barrier to the ingress of oxygen.

Containers used for storing hemoglobin solutions are often fabricated from single-ply or multilayer materials. Multilayer foils can be produced via coextrusion and/or lamination. In principle, multilayer-packaging foils and packaging materials for sensitive goods are composed of a thin gas-barrier core layer, which may have been bonded by way of an adhesion-promoter layer or a lamination-adhesive layer to outer layers. For example, a multilayer package of ethylene vinyl acetate/ethylene vinyl alcohol (EVA/EVOH) has previously been used as a primary packaging bag to minimize gas permeability and avoid the formation of inactive methemoglobin. For secondary protection of blood products, it has also previously been known that a metal foil laminate overwrap can be used to protect against potential air leakage and to maintain the product in a deoxygenated state. However, there is a potential drawback of pin holes occurring in these overwrap packages that compromises its air tightness and makes the product unstable. In particular, in the past, clear silicon containing laminates with high oxygen and moisture barrier properties have not been useful in automated packaging equipment because the stress on the material causes it to crack or otherwise lose the desired barrier properties.

Accordingly, there is a need in the field for a packaging system for storing a nonoxygenated hemoglobin solution that possesses superior oxygen barrier properties to prevent the oxidation of hemoglobin and thereby maintain the nonoxygenated hemoglobin solution in a nonoxygenated state until administration.

SUMMARY OF THE INVENTION

The present invention is directed to a packaging system for preserving a nonoxygenated hemoglobin (Hb)-based oxygen therapeutic agent (OTA). The packaging system includes a primary product-contacting package containing the OTA, and a transparent, non-foil secondary overwrap package containing the primary package. The secondary package includes a film having a first layer and a second layer. The first layer comprises aluminum oxide-coated polyester. The second layer comprises metallocene linear low density polyethylene layer (mLLDPE). The OTA is maintained in a nonoxygenated state prior to administration.

BRIEF DESCRIPTION OF THE DRAWINGS

FIG. 1 shows a packaging system of the invention comprising a primary package containing a hemoglobin-base oxygen therapeutic agent within a transparent non-foil secondary overwrap package.

Corresponding reference characters indicate corresponding parts throughout the drawings.

DETAILED DESCRIPTION OF THE INVENTION

The present invention relates generally to a packaging system for preserving a nonoxygenated hemoglobin based oxygen therapeutic agent ("hemoglobin solution"). More specifically, the present invention relates to a transparent overwrap packaging system comprising a primary product contacting package, a secondary package comprising a multilayer high barrier oxygen overwrap.

To facilitate understanding of the invention set forth in the disclosure that follows, a number of terms are defined below.

When the terms "one," "a," or "an" are used in this disclosure, they mean "at least one" or "one or more," unless otherwise indicated.

The terms "activated polyalkylene oxide" or "activated PAO" as used herein refer to a PAO molecule that has at least one functional group. A functional group is a reactive moiety that interacts, for example, with free amines, sulfhydryls or carboxyl groups on a molecule to be conjugated with PAO. For example, one such functional group that reacts with free sulfhydryls is a maleimide group. Correspondingly, a functional group that reacts with free amines is a succinimide group.

The term "heme protein" as used herein to any single or multiple chain protein that bears a heme moiety that binds gases, such as oxygen, nitric oxide and carbon monoxide.

The terms "hemoglobin" or "Hb" as used herein refer generally to the protein within red blood cells or generated through recombinant synthetic means that transports gases, such as molecular oxygen. Each molecule of Hb has 4 subunits, 2 α-chain subunits and 2 β-chain subunits, which are arranged in a tetrameric structure. Each subunit also contains one heme group, which is the iron-containing center that binds the ligands $O_2$, NO or CO. Thus, each Hb molecule can bind up to 4 ligand molecules, making $HbO_2$, HbNO, or HbCO, liganded compounds, respectively. Furthermore, as used herein, the terms "hemoglobin" or "Hb" may also refer to modified hemoglobin or modified Hb i.e., Hb that has been altered by a chemical reaction, such as intra- and inter-molecular crosslinking, and recombinant techniques, such that the Hb is no longer in its "native" state. Moreover, as used herein, the terms "hemoglobin" or "Hb" refer to both native unmodified Hb and modified Hb, unless otherwise indicated.

The term "high barrier" as used herein means that the material is capable of keeping out substantially all gaseous contamination such as oxygen and carbon dioxide, pollutants such as sulfur dioxide and ozone, and water vapor under normal storage and handling, such that the atmosphere within the overwrap is substantially free of such gases for a substantial length of time.

The terms "methemoglobin" or "metHb" as used herein refer to an oxidized form of Hb that contains iron in the ferric state. MetHb does not function as a ligand carrier. The term "methemoglobin %" as used herein refers to the percentage of oxidized Hb to total Hb.

The terms "mixture" or "mixing" as used herein refer to a mingling together of two or more substances without the occurrence of a reaction by which they would lose their individual properties.

The term "nonoxygenated" means that the heme protein or hemoglobin is in the non-liganded, deoxygenated state, or it is liganded with a gas other than $O_2$, such as NO or CO.

The term "oxygen therapeutic agent" as used herein refers to a heme protein that is capable of binding to and carrying molecular oxygen to cells/tissues/organs in need thereof. When administered in the form of a CO- or NO-liganded heme protein, once the CO or NO is released from the heme moiety, the heme groups are then free to bind to and carry molecular oxygen.

The term "polyalkylene oxide" or "PAO" as used herein refers to suitable synthetic hydrophilic polymers such as PEG, POE, polypropylene oxide or a polyethylene/polypropylene oxide copolymer. Other straight, branched chain and optionally substituted synthetic polymers that would be suitable in the practice of the present invention are well known in the medical field.

The terms "polymer," "polymeric," and the like, unless specifically defined herein, generally include homopolymers, copolymers, terpolymers, and blends and modifications thereof.

The term "polyolefin" as used herein refers to olefin polymers and copolymers, especially ethylene and propylene polymers and copolymers, and to polymeric materials having at least one olefinic comonomer, such as ethylene vinyl acetate copolymer and ionomer. Polyolefins can be linear, branched, cyclic, aliphatic, aromatic, substituted, or unsubstituted. Included in the term "polyolefin" are homopolymers of olefin, copolymers of olefin, copolymers of an olefin and a non-olefinic comonomer copolymerizable with the olefin, such as vinyl monomers, modified polymers of the foregoing, and the like. Modified polyolefins include modified polymers prepared by copolymerizing the homopolymer of the olefin or copolymer thereof with an unsaturated carboxylic acid, e.g., maleic acid, fumaric acid or the like, or a derivative thereof such as the anhydride, ester metal salt or the like. It could also be obtained by incorporating into the olefin homopolymer or copolymer, an unsaturated carboxylic acid, e.g., maleic acid, fumaric acid or the like, or a derivative thereof such as the anhydride, ester metal salt or the like.

The term "solution" refers to a liquid mixture and the term "aqueous solution" refers to a solution that contains some water and may also contain one or more other liquid substances with water to form a multi-component solution.

The terms "stroma-free hemoglobin" or "SFH" as used herein refer to Hb from which all red blood cell membranes have been removed.

The term "nonoxygenated hemoglobin based oxygen therapeutic agent" as used herein means that the heme protein or hemoglobin is in the non-liganded, deoxygenated state, or it is liganded with a gas other than $O_2$, such as NO or CO.

Primary Package

The invention relates to a packaging system for maintaining a nonoxygenated hemoglobin based oxygen therapeutic agent in a nonoxygenated state. The packaging system is composed of multiple layers, including a primary product contacting layer and a secondary high barrier overwrap layer. Each layer of the primary package can be continuous and has a substantially contiguous relationship to the adjacent layers. The multiple layers in any one construction can be unified into a single multilayer film such that the layers do not readily separate. Alternatively, the multiple layers are individually separable one layer to the next adjacent layer.

The packaged hemoglobin solution of the present invention is substantially oxygen free throughout the shelf life of the solution. However, it is expected that a small amount of oxygen may be present in the solution, such as oxygen introduced into the solution as part of the manufacturing or packaging processes. Further, it is expected that, under normal storage conditions, oxygen may also penetrate the flexible package containing the hemoglobin solution. Accordingly, the hemoglobin solution is substantially oxygen free when the amount of oxygen introduced into the solution does not affect the clinical usefulness of the solution.

The invention provides for several methods of preventing the oxygenation of the hemoglobin solution. First, the container for the hemoglobin solution may be a substantially oxygen-impermeable package such as a multi-layer polymeric film which allows for the transparency, flexibility and strength required of containers for medical solutions. Alternatively, the container for the hemoglobin solution may be an oxygen permeable package. Further, the solution may contain one or more preservatives which reduce or consume oxygen in the solution, thereby preventing oxygen from oxidizing the hemoglobin. Moreover, the solution should be packaged under an inert gas or in a manner that maintains the atmospheric oxygen in the "head space" in the container to less than about 2 cc of residual oxygen per package.

A polymer film is substantially oxygen impermeable when the clinical usefulness of a hemoglobin solution, packaged in a container comprising the polymer film, is not diminished due to oxygen penetrating the film over the shelf life of the product under the appropriate storage conditions. Typically, the oxygen permeability of the polymer film will depend upon the type of materials used, the thickness of the materials and storage conditions (lower storage temperatures yield lower oxygen permeability). With regard to any one particular material, thicker materials are generally less flexible and less transparent than thinner materials.

For example, a primary product contacting layer can comprise an oxygen barrier layer that may be oxygen impermeable or permeable. Non-limiting examples of materials that may be used for the primary product contacting layer include polymer films, such as ethylene vinyl acetate (EVA), ethylene vinyl alcohol (EVOH), polypropylene (PP), polyethylene (PE), polyethylene terephthalate (PET), low density polyethylene (LDPE), medium density polyethylene (MDPE), laminates and copolymers thereof. Polymer materials of this nature are available, for example, from American Renolit Corporation (Commerce, Calif.), Cryovac, Inc. (Duncan, S.C.), and Solvay-Draka, Inc. (Commerce, Calif.).

For example, the primary product contacting layer can comprise a bag, wherein the bag is a multi-layer film comprising the following layers: (1) a polyvinyl alcohol (PVA) layer; (2) an ethylene vinyl acetate (EVA) layer; and (3) an ethylene vinyl alcohol (EVOH) layer.

The primary product containing package can house detailed label instructions and minimize the likelihood of physical damage caused by handling or tampering.

Secondary Overwrap Package

In accordance with the packaging system of the present invention, a secondary high barrier overwrap is also described herein. The secondary high barrier overwrap may be formed with, but are not limited to, polymer films and laminates, including transparent laminate materials e.g., silicon oxide, aluminum oxide or EVOH-containing laminates. Other exemplary materials include various polyethylene polymers such as low density polyethylene (LDPE), linear low density polyethylene (LLDPE), linear medium density polyethylene (LMDPE), very low density polyethylene (VLDPE) and ultra low density polyethylene (ULDPE). The secondary high barrier overwrap is preferably a transparent, non-foil, aluminum oxide-coated polyester with a metallocene linear low density polyethylene layer.

Moreover the secondary high barrier overwraps of the present invention can be of a variety of constructions, including vials, cylinders, boxes, etc. When the secondary high barrier overwrap is in the shape of a bag, a suitable bag can be formed by continuously bonding one or more sheets at the perimeter(s) thereof to form a tightly closed, oxygen permeable or impermeable, construction having a fillable center. The shape of the bag can be those routinely encountered in the art, such as in the shape of a medical IV bag. The polymeric film for packaging the hemoglobin solution can be a thermoplastic material, generally in sheet or web form, having one or more layers of polymeric materials which may be bonded together by any suitable means well known in the art. In the case of laminates comprising polyolefins, such as linear low density, low density, medium or high density polyethylene or polypropylene and copolymers thereof, the perimeter of the bag is bonded or sealed using heat. However, any method for sealing known by one of ordinary skill in the art may be employed for purposes of carrying out the present invention. Moreover, the overwraps according to the present invention may be made via cast coextrusion, extrusion coating and/or extrusion lamination, adhesive lamination, blown-film coextrusion or monolayer extrusion or any other film-making method generally known to those having ordinary skill in the art.

Preferably, the secondary high barrier overwrap has an oxygen transmission rate of approximately 0.0008 cc/100 in$^2$/day/atm and a water vapor transmission rate of 0.0008 g/100 in$^2$/day. Such a secondary high barrier overwrap is a transparent, non-foil, aluminum oxide-coated polyester with a metallocene linear low density polyethylene layer, such as RPP#37-1275 grade LLDPE or an LLDPE commercially available as ClearFoil® Z (Rollprint, Addison, Ill.).

Oxygen Scavenger Packet

In addition to a primary product contacting layer and a secondary high barrier overwrap as described, the present invention also features an oxygen scavenging packet. For example, the oxygen scavenging packet can be a perforated polyester pouch filled with a composition containing iron powder, amorphous silica, water and sodium chloride, such as FreshPax™, available from Multisorb Technologies, Inc. (Buffalo, N.Y.). This exemplary oxygen scavenging packet has a 100 cc minimum of oxygen absorbing capabilities in 72 hours at 68-73° F. in a sealed barrier pouch at ambient oxygen conditions.

Stability

One measurement of oxygenation of the packaged hemoglobin solution is the methemoglobin concentration expressed as the percentage of the total hemoglobin that is oxidized in the methemoglobin state. In the substantially oxygen free solution, methemoglobin concentration is typically less than about 1.5% during production and packaging. The clinical usefulness of the hemoglobin solution is compromised when oxygen present in solution causes the oxidation of the hemoglobin in the solution to methemoglobin. The maximum acceptable concentration of methemoglobin is about 10% which is the percentage of total hemoglobin that has been oxidized. It is preferred that the concentration of methemoglobin in solution is less than about 5.0%.

The packaging system may further comprise an interface port, such as but not limited to, a boat shaped port, hard port, saddle port, face port and spike port. Exemplary spike ports are available, for example, from Technoflex (France). Suitable ports for use in the packaging system of the present invention are well known to those of ordinary skill in the art.

The values and ranges used to describe the invention are desirable to attain the goals of the invention. However, it should be understood that small variations from these ranges may not substantially affect the performance of the hemoglobin solution. Therefore, the invention provides for a packaged hemoglobin solution having the described characteristics and the solution may vary from those characteristics to the extent that the clinical usefulness of the packaged hemoglobin solution is not compromised.

Further, as can be appreciated by those having ordinary skill in the art, the packaging system of the present invention is not limited solely to the exemplary multilayered structures described herein. Multilayered packaging structures having more or fewer number of layers than those described are included within the scope of the present invention. For example, additional layers, such as but not limited to EVA, EVOH, PP or PE, may be included in the packaging system in order to increase the moisture barrier capabilities if desired. Additional oxygen barrier layers may also be included if desired.

What is claimed is:

1. A packaging system for preserving a nonoxygenated hemoglobin based oxygen therapeutic agent comprising:
    a) a primary product-contacting package containing the oxygen therapeutic agent; and
    b) a transparent, non-foil secondary overwrap package containing the primary package, wherein the secondary package comprises a film having a first layer and a second layer, wherein the first layer comprises aluminum oxide-coated polyester, and wherein the second layer comprises metallocene linear low density polyethylene;
    wherein the oxygen therapeutic agent is maintained in a nonoxygenated state prior to administration.

* * * * *